(12) United States Patent
Pouzadoux et al.

(10) Patent No.: US 10,844,725 B2
(45) Date of Patent: Nov. 24, 2020

(54) LEADING EDGE SHIELD

(71) Applicant: SAFRAN AIRCRAFT ENGINES, Paris (FR)

(72) Inventors: Frédéric Jean-Bernard Pouzadoux, Moissy-Cramayel (FR); Alain Jacques Michel Bassot, Moissy-Cramayel (FR); Jérémy Guivarc'h, Moissy-Cramayel (FR); Gilles Pierre-Marie Notarianni, Moissy-Cramayel (FR); Thibault Ruf, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 335 days.

(21) Appl. No.: 16/063,824

(22) PCT Filed: Dec. 21, 2016

(86) PCT No.: PCT/FR2016/053605
§ 371 (c)(1),
(2) Date: Jun. 19, 2018

(87) PCT Pub. No.: WO2017/109406
PCT Pub. Date: Jun. 29, 2017

(65) Prior Publication Data
US 2020/0270997 A1    Aug. 27, 2020

(30) Foreign Application Priority Data

Dec. 21, 2015  (FR) ...................... 15 63006

(51) Int. Cl.
*F01D 5/28* (2006.01)
*F01D 5/14* (2006.01)

(52) U.S. Cl.
CPC .............. *F01D 5/147* (2013.01); *F01D 5/28* (2013.01); *F05D 2240/303* (2013.01)

(58) Field of Classification Search
CPC . F01D 5/147; F01D 5/28; F01D 5/286; F05D 2240/303; B64C 11/20; B64C 11/205
See application file for complete search history.

(56) References Cited

U.S. PATENT DOCUMENTS

| | | | |
|---|---|---|---|
| 5,141,400 A | 8/1992 | Murphy et al. | |
| 2011/0229334 A1* | 9/2011 | Alexander | ............ F01D 5/3015 416/224 |

FOREIGN PATENT DOCUMENTS

| | | |
|---|---|---|
| CN | 103052807 A | 4/2013 |
| CN | 104271888 A | 1/2015 |

(Continued)

OTHER PUBLICATIONS

Official Communication issued in corresponding Russian Application No. 2018126597 dated May 28, 2020 (12 pages).

(Continued)

*Primary Examiner* — Richard A Edgar
(74) *Attorney, Agent, or Firm* — Bookoff McAndrews, PLLC

(57) ABSTRACT

A leading edge shield for a turbomachine blade extends heightwise from a bottom end to a top end, presents an outside face overlying a leading edge and an inside face for fastening to a blade body, and includes a pressure side wing, a suction side wing, and a central section joining together the pressure side wing and the suction side wing. Between the outside face and the inside face, the central section presents thickness that is greater than the thicknesses of the pressure side and suction side wings. The thickness of the central section increases with a gradient that is stable or increasing over a first segment from the bottom end of the leading-edge shield, but it presents a gradient that decreases beyond said first segment.

8 Claims, 2 Drawing Sheets

(56) References Cited

FOREIGN PATENT DOCUMENTS

| EP | 2378079 A2 | 10/2011 |
|---|---|---|
| FR | 2994717 A1 | 2/2014 |
| RU | 2498083 C2 | 11/2013 |
| WO | WO 2014/055499 | 4/2014 |

OTHER PUBLICATIONS

International Search Report and Written Opinion with English translation dated Apr. 4, 2017, in International Application No. PCT/FR2016/053605 (11 pages).

* cited by examiner

LEADING EDGE SHIELD

CROSS-REFERENCE TO RELATED APPLICATIONS

This application is the U.S. national phase entry under 35 U.S.C. § 371 of International Application No. PCT/FR2016/053605, filed on Dec. 21, 2016, which claims priority to French Patent Application No. 1563006, filed on Dec. 21, 2015, the entireties of each of which are herein incorporated by reference.

BACKGROUND OF THE INVENTION

The present invention relates to a leading-edge shield for a turbomachine blade. The term "turbomachine" is used in this context to mean any machine in which energy can be transferred between a fluid flow and at least one set of blades, e.g. such as a compressor, a pump, a turbine, a propeller, or indeed a combination of at least two of the above.

Such leading-edge shields are typically for protecting the leading edges of rotating blades or of guide vanes against impacts. The term "blades" is used in this context both for fan blades and for the blades of an aircraft propeller. In order to limit their weight, such blades are typically mainly in the form of a blade body made of organic matrix composite material, e.g. a polymer, reinforced by fibers. Although such materials present mechanical qualities that are generally very favorable, in particular concerning their weight, they are nevertheless somewhat sensitive to point impacts. Shields, typically made of very strong metal material such as titanium alloys, are thus normally installed on the leading edges of such blades, in order to protect them against such impacts. Such shields, which extend from a bottom end adjacent to the blade root to a top end adjacent to the blade tip and which present an outside face overlying the leading edge and an inside face for fastening to the blade body, are normally in the form of a thin pressure side wing and a thin suction side wing joined together by a thicker central section over the leading edge, the shield as a whole thus fitting closely to the shape of the blade on its leading edge and on its adjacent pressure side and suction side sections. Because of the rotation of the blades, impact speeds normally increase towards the blade tip, so the thickness between the inside and outside faces of the central section of the shield typically varies with an increasing relationship going from the bottom end to the top end of the shield. Nevertheless, that presents the drawback of increasing the weight of the shield, and above all its inertia about an axis extending in the height direction.

OBJECT AND SUMMARY OF THE INVENTION

The present disclosure seeks to remedy those drawbacks by proposing a leading-edge shield for a turbomachine blade that makes it possible to provide protection that is appropriate for the blade with weight and inertia that are reduced.

In at least one embodiment, this object is achieved by the fact that, in said leading-edge shield, which may be made of metal material, which extends heightwise from a bottom end to a top end, presenting an outside face overlying a leading edge and an inside face for fastening to a blade body, and which includes a pressure side wing, a suction side wing, and a central section joining together the pressure side wing and the suction side wing, the central section presents thickness between the outside face and the inside face that is greater both than a corresponding thickness of the pressure side wing and also than a corresponding thickness of the suction side wing between the inside face and the outside face, in which the thickness of the central section firstly increases with a gradient that is stable or increasing over a first segment extending over at least 60%, or indeed 80%, of the height of the leading-edge shield from the bottom end of the leading-edge shield, and the thickness of the central section secondly presents a gradient that decreases beyond said first segment. The thickness of the central section may even decrease over a second segment of the leading-edge shield that is situated beyond the first segment.

By means of these provisions, it is possible to reduce the weight and the inertia added by the shield to the blade when the blade is less exposed to impacts beyond said first segment.

The present disclosure also provides a blade extending heightwise from a blade root to a blade tip and comprising a blade body with such a leading edge shield assembled to the blade body, the blade body being made of fiber-reinforced composite material having an organic matrix, e.g. a polymer matrix, the leading-edge shield being made of a material with better point impact resistance than the composite material of the blade body, and the bottom end of the shield being closer to the blade root than is the top end.

The present disclosure also provides a turbomachine including a plurality of such blades, a fan including a plurality of such blades, and a turbofan including such a fan.

BRIEF DESCRIPTION OF THE DRAWINGS

The invention can be well understood and its advantages appear better on reading the following detailed description of embodiments shown as nonlimiting examples. The description refers to the accompanying drawings, in which.

DETAILED DESCRIPTION OF THE INVENTION

Figure 1:
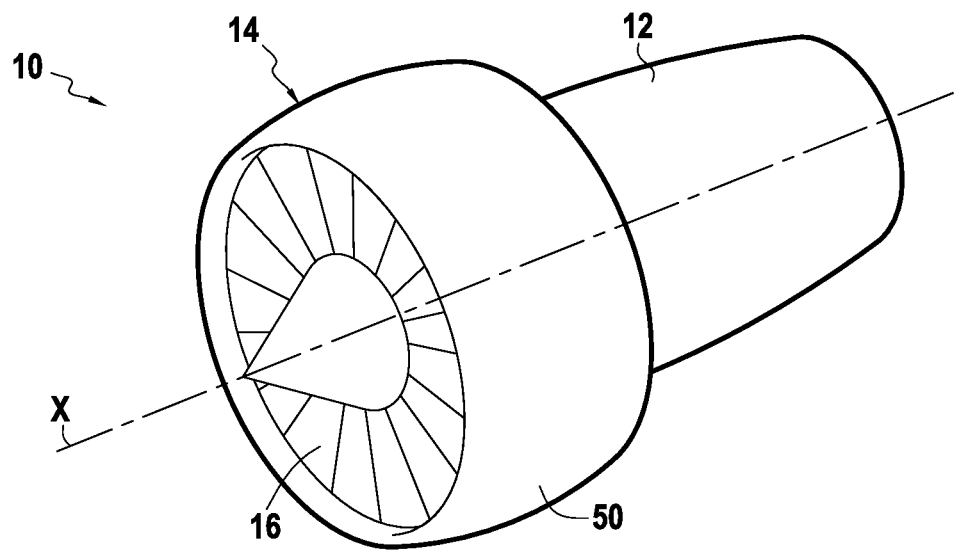
FIG. 1 is a diagrammatic perspective view of a turbofan.
Figures 2A, 2B:
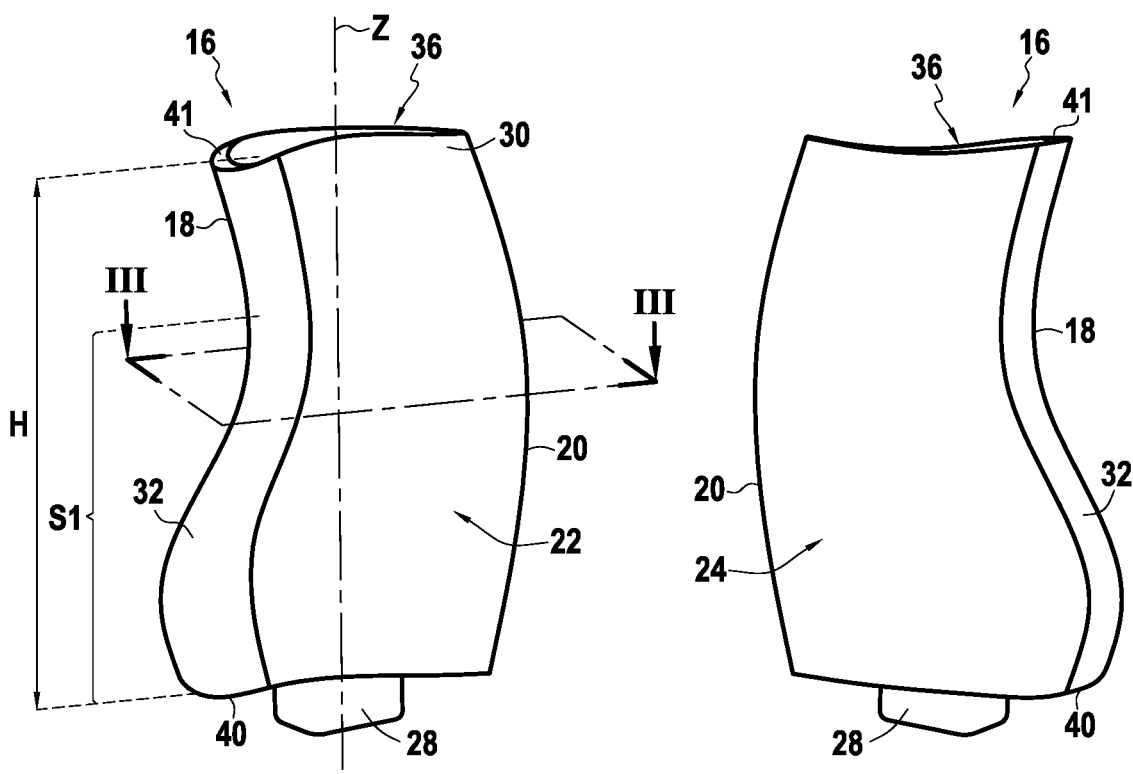
FIGS. 2A and 2B are diagrammatic perspective views respectively of the pressure side and the suction side of a rotary blade of the FIG. 1 turbofan in an embodiment of the blade.
Figure 3:
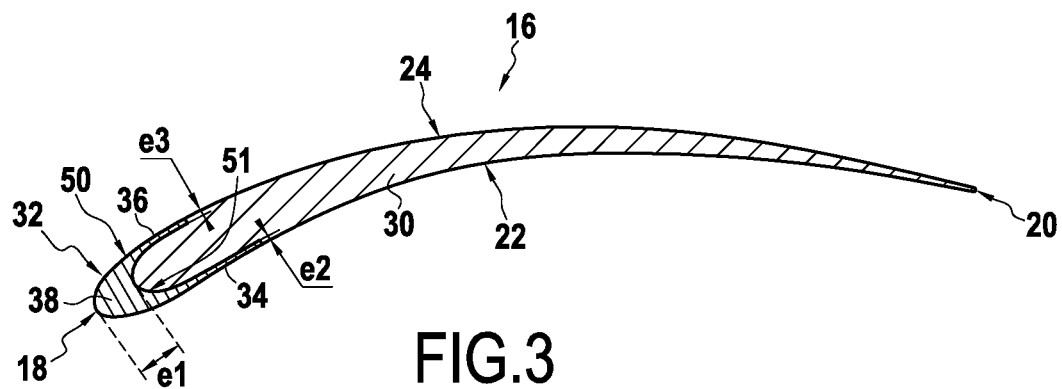
FIG. 3 is a fragmentary section view of the blade of FIGS. 2A and 2B on the plane III-III.

FIG. 1 shows a turbofan 10 comprising a gas generator unit 12 and a fan 14. The fan 14 comprises a plurality of rotary blades 16 arranged radially around a central axis X, the blades being aerodynamically profiled so as to impel air when they rotate, and being surrounded by a fan casing 50. Thus, as shown in FIGS. 2A, 2B, and 3, each blade 16 presents a leading edge 18, a trailing edge 20, a pressure side 22, a suction side 24, a blade tip 26, and a blade root 28.

In normal operation, the relative airflow is directed substantially towards the leading edge 18 of each blade 16. Thus, the leading edge 18 is particularly exposed to impacts. In particular when the blade 16 comprises a blade body 30 made of composite material, in particular a material having a polymer matrix reinforced by fibers, it is appropriate to protect the leading edge 18 with a leading-edge shield 32 integrated in each blade. In other words, the leading-edge shield 32 is assembled on the blade body 30.

The leading-edge shield 32 is made of a material with better point impact resistance than the composite material of the blade body 30. The leading-edge shield 32 is made mainly of metal, and more specifically out of a titanium-based alloy such as TA6V (Ti-6Al-4V), for example. The leading-edge shield 32 could equally well be made of steel or of the metal alloy commonly referred to by the registered trademark Inconel™. The term "Inconel" is used herein to refer to an alloy based on iron alloyed with nickel and chromium.

The leading-edge shield 32 extends over a height H along an axis Z from a bottom end 40 to a top end 41, it presents an outside face 50 overlying the leading edge 18 and an inside face 51 that is to be fastened to the blade body 30, and it includes a pressure side wing 34, a suction side wing 36, and a central section 38 connecting together the pressure side wing 34 and the suction side wing 36 over the height H of the shield 32. The pressure side and suction side wings 34 and 36 serve to position the shield 32 on the blade body 30. As shown in FIG. 3, which is a cross-section on a plane III-III extending transversely to the axis Z of the height H of the shield 32, the thickness e1 of the central section 38 between the outside face 50 and the inside face 51 of the shield 32 is substantially greater than the thicknesses e2 and e3 respectively of the pressure side wing 34 and of the suction side wing 36 between the outside face 50 and the inside face 51, in order to withstand the impacts that are concentrated on the central section 38.

Figure 4:
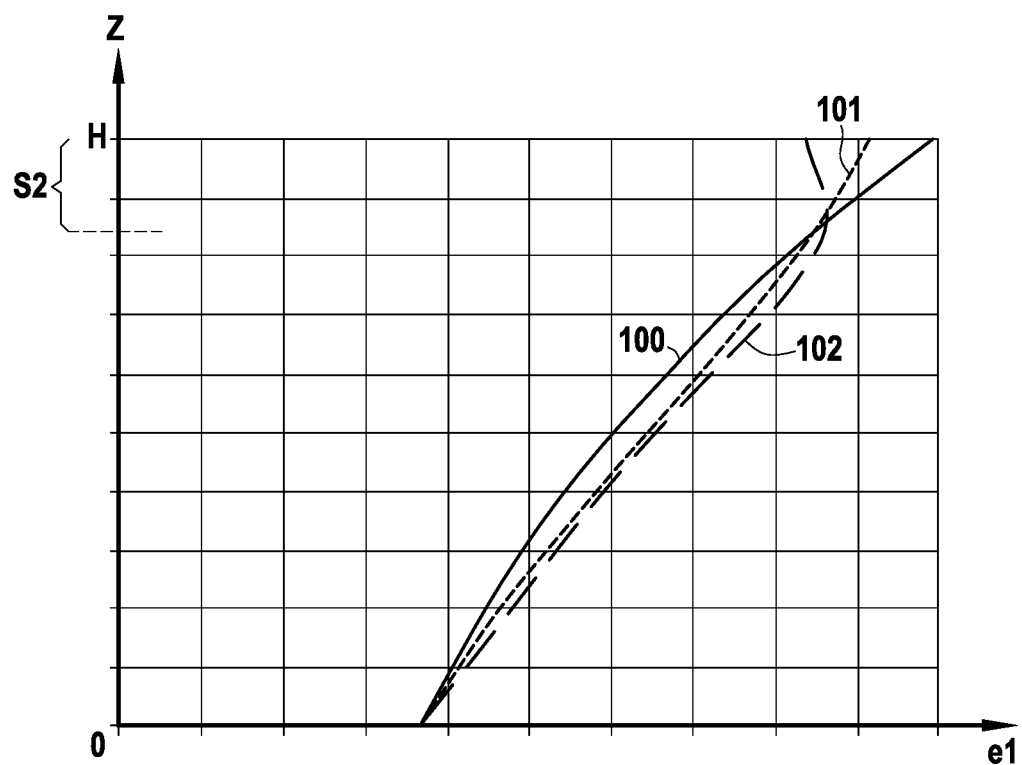
FIG. 4 is a graph showing the relationships for variation in the thickness of the central section of leading-edge shields in two embodiments, compared with the relationship for a leading-edge shield of the prior art.

Since each blade 16 rotates about the central axis X of the turbofan 1 when it is in operation, the tangential speed of the leading edge 18 increases going from the root 26 to the tip 28 of the blade. In known shields, in order to take account of the effect of this increasing speed on the impact speeds against the blade, the thickness e1 of the central section of the shield increases going from the bottom end to the top end of the shield, in application of an increasing relationship having a gradient that is stable or even increasing, as shown by curve 100 in FIG. 4, in which the vertical axis corresponds to the axis Z of the height H of the shield, and the horizontal axis corresponds to the thickness e1.

Nevertheless, the blade tip 26 is protected in part by the casing 50, for which the inlet may be narrower than the fan 14. Compared with prior art shields, it is possible to envisage reducing the thickness e1 of the central section of the shield 32 in the proximity of the blade tip 26 without negative effects on safety. The thickness e1 of the central section 38 of the shield 32 may thus increase with a gradient de1/dZ that is stable, i.e. constant, or that increases over a first segment S1 starting from the bottom end 40 of the shield 32, while presenting a gradient that decreases beyond this first segment S1. For example, in a first embodiment shown in FIG. 4 by curve 101, the thickness e1 continues to increase beyond the first segment S1 to the top end 41, but with a gradient de1/dZ that decreases. It is even possible, in a second embodiment shown in FIG. 4 by curve 102, to envisage that the gradient de1/dZ becomes negative, so that the thickness e1 decreases over a second segment S2 situated between the first segment S1 and the top end 41 of the shield 32. Relative to the comparative example shown by the curve 100, it is thus possible to reduce the weight and above all the inertia that are added to the blade 16 by the shield 32.

Although the present invention is described with reference to specific embodiments, it is clear that various modifications and changes can be undertaken on those embodiments without going beyond the general ambit of the invention as defined by the claims. Also, individual characteristics of the various embodiments mentioned may be combined in additional embodiments. Consequently, the description and the drawings should be considered in a sense that is illustrative rather than restrictive.

The invention claimed is:

1. A leading edge shield for a turbomachine blade, said leading edge shield extending heightwise from a bottom end to a top end, presenting an outside face overlying a leading edge and an inside face for fastening to a blade body, and including a pressure side wing, a suction side wing, and a central section joining together the pressure side wing and the suction side wing, the shield being characterized in that the central section presents a thickness between the outside face and the inside face that is greater both than a corresponding thickness of the pressure side wing and also than a corresponding thickness of the suction side wing, the thickness of the central section firstly increasing with a gradient that is stable or increasing over a first segment extending over at least 60% of the height of the leading-edge shield starting from the bottom end of the leading edge shield, and secondly presenting a gradient that decreases beyond said first segment.

2. The leading edge shield according to claim 1, wherein the thickness of the central section decreases over a second segment of the leading-edge shield that is situated beyond the first segment.

3. The leading edge shield according to claim 1, made of metal material.

4. A blade extending heightwise from a blade root to a blade tip and comprising a blade body and the leading edge shield according to claim 1 assembled on the blade body, the blade body being made of fiber-reinforced organic matrix composite material, and the leading-edge shield being made of a material with better point impact resistance than the fiber-reinforced organic matrix composite material of the blade body.

5. A blade according to claim 4, wherein the bottom end of the leading-edge shield is closer to the blade root than is the top end of the leading-edge shield.

6. A turbomachine including a plurality of blades according to claim 4.

7. A fan including a plurality of blades according to claim 4.

8. A turbofan including a fan according to claim 7.

* * * * *